(12) United States Patent
Tamminga et al.

(10) Patent No.: US 10,842,254 B2
(45) Date of Patent: Nov. 24, 2020

(54) SYSTEM AND A METHOD FOR TREATING A PART OF A BODY OF A PERSON

(71) Applicant: KONINKLIJKE PHILIPS N.V., Eindhoven (NL)

(72) Inventors: Stephanus Jacob Gerardus Tamminga, Eindhoven (NL); Sven Woldberg, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 448 days.

(21) Appl. No.: 15/126,615

(22) PCT Filed: Mar. 23, 2015

(86) PCT No.: PCT/EP2015/056033
§ 371 (c)(1),
(2) Date: Sep. 16, 2016

(87) PCT Pub. No.: WO2015/140340
PCT Pub. Date: Sep. 24, 2015

(65) Prior Publication Data
US 2017/0079421 A1 Mar. 23, 2017

(30) Foreign Application Priority Data
Mar. 21, 2014 (EP) .................... 14160990

(51) Int. Cl.
*A46B 15/00* (2006.01)
*A61C 17/22* (2006.01)
(Continued)

(52) U.S. Cl.
CPC ........ *A46B 15/0006* (2013.01); *A61C 1/0015* (2013.01); *A61C 17/221* (2013.01); *A61C 19/04* (2013.01); *A46B 2200/1066* (2013.01)

(58) Field of Classification Search
CPC ..... A46B 15/006; A63C 17/221; A63C 19/04; G09B 23/283
See application file for complete search history.

(56) References Cited

U.S. PATENT DOCUMENTS

2002/0183959 A1   12/2002   Salvill
2008/0060148 A1*   3/2008   Pinyayev ............. A61B 5/0088
                                                        15/22.1
(Continued)

FOREIGN PATENT DOCUMENTS

EP    2384720 A2      11/2011
WO    2013001462 A2    1/2013

OTHER PUBLICATIONS

Hooman Dejnabadi, Brigitte M. Jolles, and Kamiar Aminian, "A New Approach to Accurate Measurement of Uniaxial Joint Angles Based on a Combination of Accelerometers and Gyroscopes", IEEE Trnasactions on Bimedical Eng., vol. 52, No. 8 Aug. 2005, p. 1478-1484.

(Continued)

*Primary Examiner* — Peter R Egloff

(57) ABSTRACT

The present application relates to a system (10, 60) for treating a part of a body of a person to be treated. The system includes a treating device (20, 70) having a treating unit (22, 72) and a reference member (40, 80) adapted to be mountable to a person in fixed relationship to a part of the body. The treating device (20, 70) has a first motion identifier (28) configured to generate information indicative of the acceleration and/or angular orientation of the treating device (20, 70). The reference member (40, 80) has a second motion identifier (48) configured to generate information indicative of the acceleration and/or angular orientation of the reference member (40, 80). A controller (27, 47) is adapted to produce information indicative of the trajectory and/or orientation of the treating unit (22, 72) relative to the part of the (Continued)

body to be treated based on the information provided by the first and second motion identifiers (28, 48). The present application also relates to a treating device (20, 70) and a method of treating a part of a body of a person to be treated.

8 Claims, 2 Drawing Sheets

(51) Int. Cl.
*A61C 1/00* (2006.01)
*A61C 19/04* (2006.01)

(56) References Cited

U.S. PATENT DOCUMENTS

| | | |
|---|---|---|
| 2009/0291422 A1 | 11/2009 | Puurunen |
| 2009/0320227 A1* | 12/2009 | Cohen ............... A46B 15/0002 15/167.1 |
| 2011/0010875 A1 | 1/2011 | Iwahori |
| 2012/0310593 A1* | 12/2012 | Bates ............... A46B 15/0002 702/150 |
| 2013/0000670 A1 | 1/2013 | Binner |
| 2013/0116602 A1 | 5/2013 | Van Den Heuvel |
| 2015/0107034 A1* | 4/2015 | Shani ............... A61C 17/221 15/22.1 |

OTHER PUBLICATIONS

Jeong-Whan Lee, Kang-Hwi Lee, Kyeong-Seop Kim, Dong-Jun Kim, "Development of Smart Toothbrush Monitoring System for Ubiquitoius Healthcare", Engineering in Medicicine and Biology Society, 2006. EMBS 2006, 28th Annual Int. Conf. of the IEEE. pp. 6422-6425.

Young-Jae Lee; Il-Jae Lee, Keyong-Seop Kim, Wonse Partk, Kee-Deog Kim, Dosik Hwang, Jeong-Whan Lee, Tooth Brushing Region Detection Using Three-Axis Accelerometer and Magnetic Sensor, Biomedical Eng. IEEE Transaction , vol. 59, Issue 3, p. 872-881.

Cheol-Hong Min, Nuri F. Ince, and Ahmed H. Twefik, "Early Morinig Activity Detection Using Acoustics and Wearble Weirless Sensors", 16th European Signal Processing Conference (EUSIPCO 2008), Lausanne, Switzerland, Aug. 25-29, 2008, copyright by EURASIP.

Daniel Roetenberg, Henk Luinge, and Per Slycke, "Xsens MVN: Full 6DOF Human Motion Tracking Using Miniature Inertial Sensors", XSENS Technologies—Version Apr. 3, 2013, pp. 1-9.

Walji MF, Coker O, Valenza JA, Henson H, Warren-Morris D, Zhong L. AMIA Annu Symp Proc. Nov. 6, 2008:1167, "A persuasive toothbrush to enhance oral hygiene adherence."

* cited by examiner

SYSTEM AND A METHOD FOR TREATING A PART OF A BODY OF A PERSON

This application is the U.S. National Phase application under 35 U.S.C. § 371 of International Application No. PCT/EP2015/056033, filed on Mar. 23, 2015, which claims the benefit of International Application No. 14160990.9 filed on Mar. 21, 2014. These applications are hereby incorporated by reference herein.

FIELD OF THE INVENTION

The present invention relates to a system for treating a part of a body to be treated. In particular, the present invention relates to a system for oral healthcare including, for example, a toothbrush. The present invention also relates to a treating device for treating a part of a body to be treated, a method of treating a part of a body to be treated, and a computer program comprising instructions which, when executed by at least one processor, cause the method for treating a part of a body to be treated to be performed.

BACKGROUND OF THE INVENTION

The effectiveness of using a device for treating a part of a body, for example a toothbrush or a trimmer, is generally dependent of the motion of the device over the part of the body to be treated. With a toothbrush it is important to ensure that all of the teeth are cleaned with the toothbrush to ensure that, for example, food debris is removed from the teeth to aid prevention of the build up of plaque.

To help ensure that a user performs a recommended tooth brushing action, it is known to provide feedback to a user using a timer and an audible sound or haptic feedback to indicate to a user the length of time that a brushing operation has been in progress. This provides a user with an indication that they have spent an adequate period of time brushing their teeth.

Furthermore, it is also known to provide an indication to a user to concentrate on different areas of the mouth based on different time periods. However, this does not provide an accurate indication of which teeth have actually been cleaned.

Furthermore, it is known from US patent application US 2002/0183959 A1 to have a toothbrush system wherein the position of the toothbrush is analysed with respect to sensors positioned in fixed relationship to the teeth of the user. In this system a transmitting unit generates a known DC magnetic field used by the sensors positioned on the user and a sensor in the toothbrush to determine the position of the toothbrush relative to the sensors positioned on the user.

SUMMARY OF THE INVENTION

It is an object of the invention to provide a system for treating a part of a body to be treated, a treating device for treating a part of a body to be treated, a method of treating a part of a body to be treated, and/or a computer program comprising instructions which, when executed by at least one processor, cause the method for treating a part of a body to be treated to be performed which substantially alleviates or overcomes at least one of the problems mentioned above.

According to one aspect of the present invention, there is provided a system for treating a part of a body of a person to be treated comprising a treating device having a treating unit, a reference member adapted to be mountable to a person in fixed relationship to a part of the body, the treating device having a first motion identifier configured to generate information indicative of the acceleration and/or angular orientation of the treating device, the first motion identifier being one of a 6-axis spatial sensor, set of inertial sensors, accelerometers, gyroscopes, or combinations thereof, the reference member having a second motion identifier configured to generate information indicative of the acceleration and/or angular orientation of the reference member, the second motion identifier being one of a 6-axis spatial sensor, set of inertial sensors, accelerometers, gyroscopes, or combinations thereof, and a controller configured to produce information indicative of the trajectory and/or orientation of the treating unit relative to the part of the body to be treated based on the information provided by the first and second motion identifiers.

The part of the body may be the part of the body to be treated.

With such arrangements it is possible to determine the relative trajectory and/or orientation of the treating unit and the part of the body to be treated by the treating unit without the use of an additional field generating unit as e.g. disclosed in US patent application US 202/0183959 A1. This means that the system is able to provide an accurate indication of the part of the body which is being treated by the treating unit irrespective of the orientation of the part of the body. Therefore, it is possible for a user to move the part of the body without affecting the determination of the section of the part of the body that that is being treated. With this arrangement the system is able to take into account the relative position of the part of the body, and so is not dependent on a user holding the part of the body to be treated in a stationary position during treatment. This helps to ensure that the relative trajectory and/or orientation of the treating unit can be corrected dependent on movement of the part of the body to be treated.

The system may further comprise a feedback module, wherein the controller is configured to operate the feedback module to provide feedback to the person to be treated in response to the information indicative of the trajectory and/or orientation of the treating unit relative to the part of the body to be treated produced by the controller.

An advantage of this arrangement is that the system is able to provide an indication of treatment to the user based on the information indicative of the trajectory and/or orientation of the treating unit relative to the part of the body to be treated produced by the controller.

The feedback module may be configured to provide visual, audible and/or tactile feedback.

The feedback module may include a display, and the controller may be configured to operate the display to show a map of the part of the body to be treated on the display, and to provide an indication on the map of the trajectory and/or orientation of the treating unit relative to the part of the body to be treated.

With such an arrangement it is relatively straightforward for a user to be provided with accurate overview of the relative trajectory and/or orientation of the treating unit. Therefore, the user is able to perceive how treatment is proceeding.

The map may be a schematic representation of the part of the body to be treated.

Therefore, it is possible to provide an accurate graphical representation of the trajectory and/or orientation of the treating unit, and therefore areas of the part of the body that have and/or have not been treated.

The feedback module may be on the reference member.

With such an arrangement it is possible to easily provide feedback to a user. In particular, it is possible to provide direct feedback to a user because the feedback unit is mounted to a user. Furthermore, the number of components of the system may be minimised. In embodiments, the treating device may be a toothbrush. The treating unit may be a brush head. In alternative embodiments, the treating device may be a cutting device for hair.

The reference member may be a wearable electronic unit.

The reference member may be adapted to be mountable to a person's head, arm or leg. The reference member may be a band. The reference member may be a head-mountable display unit, such as a pair of smart glasses.

With such arrangements the ease of mounting the reference member relative to the part of the body to be treated is maximised. For example, if the reference member is a head-mountable display unit, such as a pair of smart glasses, then the reference member is easily mounted relative to the part of the body to be treated, for instance when the part of the body to be treated is a user's teeth, scalp and/or face. Furthermore, the reference member is interchangeable. Such arrangements allow the reference member to be mounted in a predefined position relative to the part of the body to be treated, and the reference member, for example the pair of smart glasses, may be easily removed and remounted in a repeatable fixed relative position.

The controller may include a processor and a memory.

The controller may comprise a memory storing a reference profile indicative of the part of the body to be treated, the controller may be configured to refer to the reference profile stored by the memory, and to compare the produced information indicative of the trajectory and/or orientation of the treating unit relative to the part of the body to be treated with the reference profile.

This helps to enable the system to determine the part of the body to be treated and therefore the desired trajectory and/or orientation of the treating unit relative to the part of the body to be treated.

The treating device may be switchable between a calibration mode and a treatment mode. In the calibration mode, the controller may be configured to form and store the reference profile indicative of the part of the body to be treated based on the information indicative of the trajectory and/or orientation of the treating unit relative to the part of the body to be treated produced by the controller. In the treatment mode, the controller may be configured to refer to the stored reference profile indicative of the part of the body to be treated, and to compare the produced information indicative of the trajectory and/or orientation of the treating unit relative to the part of the body to be treated with the stored reference profile.

With this arrangement it is possible to help determine an accurate profile of the part of the body to be treated and therefore aids the indication of the relative position of the treating unit. It is possible to calibrate the system to maximise the accuracy and efficiency of the system.

With such an arrangement it is possible to maximise the accuracy of the information indicative of the position of the treating unit during operation of the system. In particular, such an arrangement helps to counter against the readings of the inertial navigation system drifting over time and so accumulating a positioning error.

In the calibration mode, the controller may be configured to modify an existing stored reference profile indicative of the part of the body to be treated based on the information indicative of the trajectory and/or orientation of the treating unit relative to the part of the body to be treated produced by the controller to form a new reference profile, and configured to store the new reference profile.

With such an arrangement it is possible for a user to change an existing profile to form a new profile. The new profile may replace or be stored together with the existing profile.

In the calibration mode, the controller may be configured to modify the existing stored reference profile based on information indicative of the trajectory and/or orientation of the treating unit relative to one or more predefined positions of the part of the body to be treated.

The one or more predefined positions of the part of the body to be treated may be one or more extremities of the part of the body to be treated.

In the treatment mode, the controller may be configured to select between two or more reference profiles. The selection between two or more reference profiles may be in response to a user input.

Therefore, it is possible for the system to be used by more than one user, and/or to be used to perform different treatments.

The controller may be configured to track the trajectory and/or angular orientation of the treating device and to compare the tracked trajectory and/or angle of orientation of the treating device with the reference profile indicative of the part of the body to be treated to determine an area of the part of the body to be treated that has been treated by the treating device based on the tracked trajectory and/or angle of orientation of the treating unit.

The controller may be configured to operate the feedback module based on the information indicative of the trajectory and/or orientation of the treating unit relative to the part of the body to be treated produced by the controller to provide an indication of the area of the part of the body to be treated that has been treated by the treating unit.

The controller may be configured to operate the feedback module when the controller has determined that a predefined area of the part of the body to be treated has been treated by the treating device.

An advantage of the above arrangements is that it is possible to provide feedback on the part of the body that has been treated, and/or to provide feedback on the part of the body that has not been treated. Therefore, it is possible for a user to easily identify regions that have already been treated and so do not need further treatment, and/or regions that are yet to be treated. This helps to ensure that all of the part of the body to be treated has been treated. Such an arrangement helps to prevent regions of the part of the body to be treated from being missed during use of the system. This may help to ensure that a uniform treatment is applied. Alternatively, or as well as, the above arrangements may help to prevent excess treatment being applied to one or more areas of the part of the body to be treated. Therefore, excess treatment, which may cause damage or irritation, for example, is avoided.

The controller may be configured to operate the feedback module when the controller has determined that the treating device has treated all of the part of the body to be treated.

This helps to notify a user that treatment of a predefined area of the part of the body to be treated has been completed, and so may prevent a user from spending excess time on the treatment. Furthermore, the user will be aware that they have not completed treatment if no notification has been received.

The treating device may further comprise a sensor configured to detect one or more properties of the part of the body to be treated, wherein the controller may be configured to produce information indicative of the one or more properties of the part of the body to be treated based on the information provided by the sensor.

With this arrangement it is possible to obtain information about one or more properties of the part of the body to be treated which may be used to maximize effective treatment of the part of the body to be treated.

The controller may be configured to adjust one or more operating characteristics of the treating unit in dependence on one or more of the properties of the part of the body to be treated detected by the sensor.

The controller may be configured to operate the feedback module to provide feedback to the person to be treated in response to the information indicative of the one or more properties of the part of the body to be treated based on the information provided by the sensor together with information indicative of the trajectory and/or orientation of the treating unit relative to the part of the body to be treated produced by the controller.

The controller may be configured to adjust one or more operating characteristics of the treating unit in response to the information indicative of the trajectory and/or orientation of the treating unit relative to the part of the body to be treated produced by the controller.

With such an arrangement it is possible to vary the treatment applied to the part of the body to be treated. For example, with a toothbrush it is possible to vary the speed, and therefore treating intensity, of the brush head.

According to another aspect of the invention, there is provided a treating device comprising a treating unit, and a first motion identifier configured to generate information indicative of the acceleration and/or angular orientation of the treating device, the treating device being configured to provide the information to a controller which is configured to produce information indicative of the trajectory and/or orientation of the treating unit relative to the part of the body to be treated based on the information provided by the first motion identifier and a second motion identifier of a reference member which is configured to generate information indicative of the acceleration and/or angular orientation of the reference member, the reference member being adapted to be mountable to a person in fixed relationship to a part of the body.

According to another aspect of the invention, there is provided a method of treating a part of a body of a person to be treated comprising generating information indicative of the acceleration and/or angular orientation of a treating device using a first motion identifier, generating information indicative of the acceleration and/or angular orientation of a reference member adapted to be mounted to a person in fixed relationship to a part of the body using a second motion identifier, and producing information indicative of the trajectory and/or orientation of the treating device relative to the part of the body to be treated based on the information provided by the first and second motion identifiers.

The method may further comprise operating a feedback module to provide feedback to the person to be treated in response to the produced information indicative of the trajectory and/or orientation of the treating unit relative to the part of the body to be treated.

The method may further comprise forming and storing a reference profile indicative of the part of the body to be treated based on the produced information indicative of the trajectory and/or orientation of the treating unit relative to the part of the body to be treated, and referring to the stored reference profile indicative of the part of the body to be treated, and comparing the produced information indicative of the trajectory and/or orientation of the treating unit relative to the part of the body to be treated with the stored reference profile.

The method may further comprise modifying an existing stored reference profile indicative of the part of the body to be treated based on the produced information indicative of the trajectory and/or orientation of the treating unit relative to the part of the body to be treated to form a new reference profile, and storing the new reference profile.

According to another aspect of the invention, there is provided a computer program comprising instructions which, when executed by at least one processor, cause the method of any one of claims 11 to claim 14 to be performed.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Embodiments described herein describe a system for cleaning teeth. However, it will be understood that the system as described herein is not limited to the application of cleaning teeth and may be used for different applications. That is, the system is applicable to systems for treating a part of the body of a person to be treated. For example, the embodiments described herein are applicable to, for example, an epilator, shaver, trimmer, exfoliator, microdermabrasion device, laser hair cutting device, moisturiser, intense pulsed light based device, or any other powered device which interacts with a part of a user to be treated. The treating device may apply a substance such as colouring agent, shampoo, medical substance or any other substance to the part of the body to be treated. Possible alternative uses include systems incorporating one or more non-invasive or invasive treatments such as a flosser, a shaver, alternative types of hair removal including cutting, skin cleaning, skin tanning, and/or skin rejuvenation. In such embodiments, the treating of a part of body may include application of light, application of a lotion or other fluids, and/or puncturing.

Figure 1:
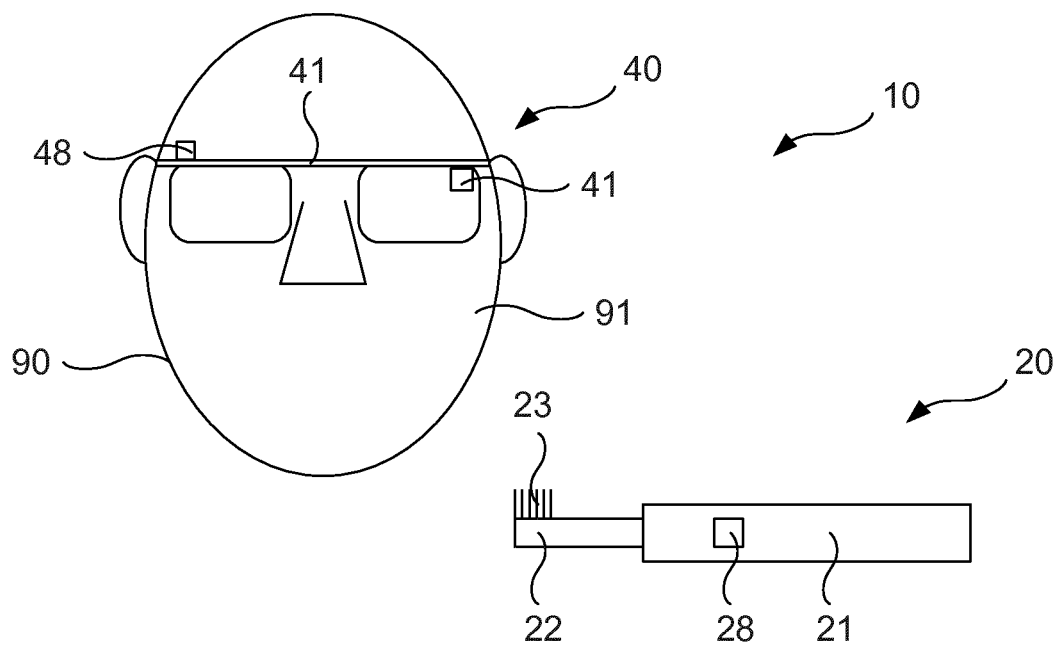
FIG. 1 shows a schematic view of one system for cleaning teeth.
Figure 3:
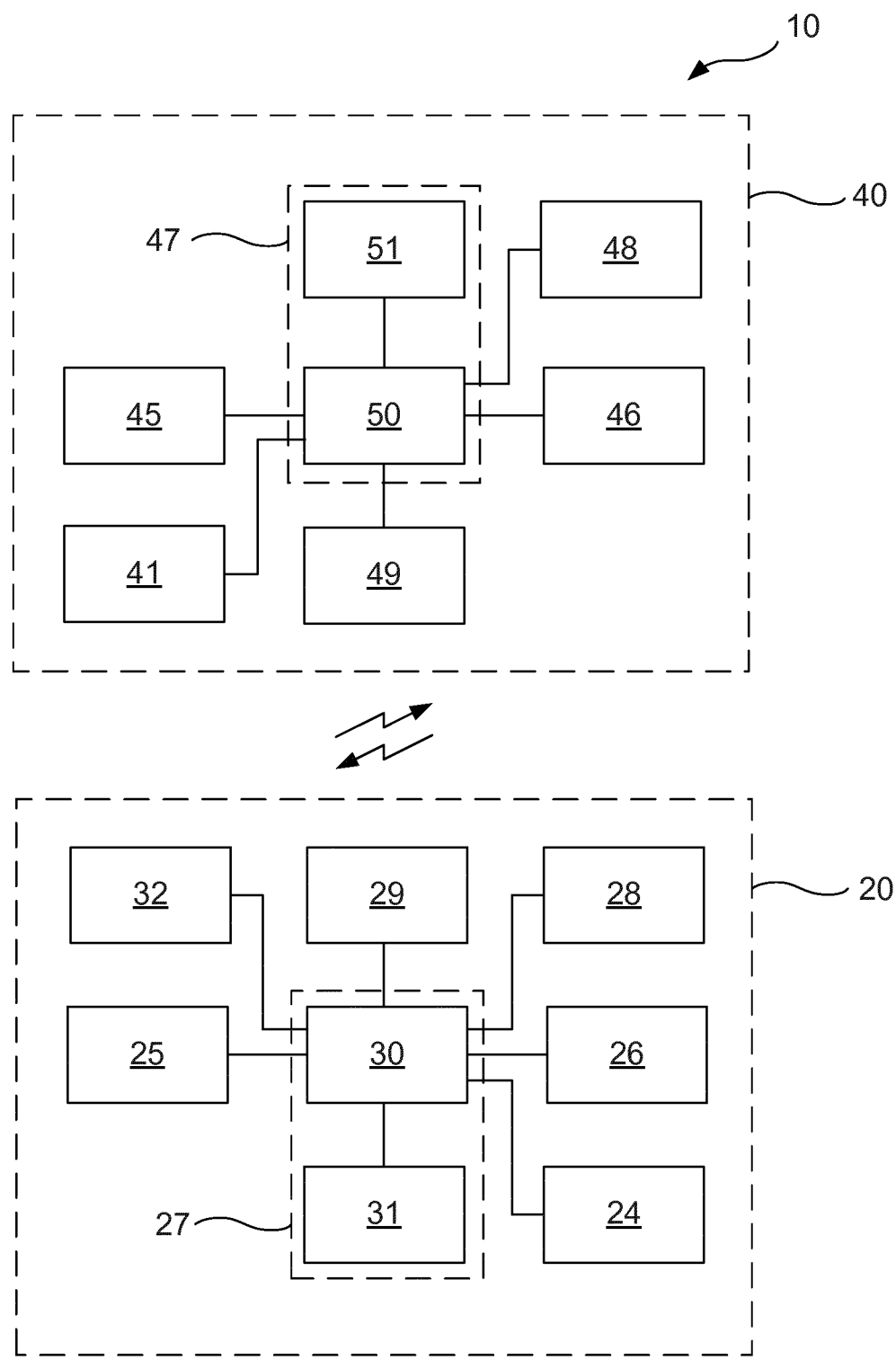
FIG. 3 shows a schematic block circuit diagram of the system of FIG. 1.

Referring to FIGS. 1 and 3, a system for cleaning teeth 10 is shown. The system 10 comprises an electric toothbrush 20 and a wearable electronic unit 40.

In the embodiments described herein, the system 10 is described by reference to the user of the system 10 being the person being treated. That is, the user is using the system to treat themselves. However, it will be understood that in an alternative embodiment the user is a person using the system 10 to apply treatment using the system 10 to another person.

The electric toothbrush 20 acts as a treating device. The electric toothbrush 20 has a handle 21 and a brush head 22. The brush head 22 acts as a treating unit. The brush head 22 extends from one end of the handle 21. The brush head 22 has bristles 23 at its distal end. The handle 21 is elongate. The handle 21 defines a body of the toothbrush. In the present embodiment the toothbrush 20 is mechanically actuated. That is, the bristles 23 are movable in response to mechanical actuation by a motor 24. The motor 24 acts as a mechanical actuator to cause the bristles to move. The mechanical actuation may cause the bristles to rotate and/or vibrate.

The motor 24 is received in the handle 21. A mechanical linkage (not shown) connects the motor to the brush head 22 to actuate the brush head 22.

Although in the present embodiment, the treating device is an electric toothbrush 20, it will be understood that in an alternative embodiment the toothbrush is a manual toothbrush (not shown). In such an arrangement, the manual toothbrush has electrical components, but the brush head is not mechanically actuated by an electrical component.

The brush head 22 is removable from the handle 21. The brush head 22 may be replaced. The brush head 22 is interchangeable with another brush head or an alternative oral care implement. Such an oral care implement may include a polishing head, a flossing head, or a tongue cleaning head. Therefore, the toothbrush 20 may have a treating head that is not a brush head. Alternatively the brush head 22 is integral with the handle 21.

The toothbrush 20 further comprises a power supply 25, such as a battery. The battery is rechargeable, and the toothbrush 20 also has a base (not shown). The base (not shown) is configured to support the toothbrush 20 in a rest position. The base has a mains power supply (not shown) and electrical contacts (not shown) which connect with corresponding electrical contacts on the handle 21. The electrical contacts may be spaced and include induction charging. In the present embodiments, the power supply is an in-built rechargeable battery, however it will be understood that alternative power supply means are possible, for example a power cord that connects the toothbrush 20 to an external electricity source. The base may also charge the wearable electronic unit 40.

The toothbrush 20 also has a user input 26. The user input 26 allows a user to operate the toothbrush 20, for example to turn the toothbrush 20 on and off. The user input 26 may, for example, be a button, touch screen or switch.

The toothbrush 20, acting as a treating device, comprises a device controller 27, a first motion identifier 28 and a device communication module 29.

The device controller 27 comprises a processor 30 and a memory 31. The device controller 27 is operable to operate the toothbrush 20.

The processor 30 may take any suitable form. For instance, the processor 30 may be or include a microcontroller, plural microcontrollers, circuitry, a single processor, or plural processors. The device controller 27 may be formed of one or multiple modules.

The memory 31 takes any suitable form. The memory 31 may include a non-volatile memory and/or RAM. The non-volatile memory may include read only memory (ROM), a hard disk drive (HDD) or a solid state drive (SSD). The memory stores, amongst other things, an operating system. The memory may be disposed remotely. The RAM is used by the processor 30 for the temporary storage of data. The operating system may contain code which, when executed by the device controller 27, controls operation of each of the hardware components of the toothbrush 20, or the system 10 including the toothbrush 20. The memory 31 may be disposed locally or remotely. The device controller 27 may be able to cause one or more objects, such as one or more profiles, to be stored remotely or locally by the memory. The device controller 27 may be able to refer to one or more objects, such as one or more profiles, stored by the non-volatile memory and upload the one or more stored objects to the RAM.

The device controller 27 is operable to operate the toothbrush 20 in response to an input, for example the user input 26. The device controller 27 is configured to actuate a motor control unit which operates the motor 24.

The first motion identifier 28 is in the handle 21 of the toothbrush 20. The handle 21 acts as a body for the toothbrush 20. The first motion identifier 28 is a 6-axis spatial sensor. Spatial sensors are known and so a detailed description will be omitted. The first motion identifier 28 is configured to provide the readings of six axes of relative motion (three axes translation and three axes rotation). The first motion identifier 28 is configured to generate information indicative of the acceleration and/or angular orientation of the toothbrush 20. The information generated by the first motion identifier 28 is provided to the device controller 27.

Although in the present and other described embodiments the first motion identifier 28 is a 6-axis spatial sensor, it will be understood that alternative sensors may be used. The first motion identifier 28 may include one or more different sensors, for example, inertial sensors, accelerometers, gyroscopes, or combinations thereof. The first motion identifier 28 may also include a calibration module, such as a magnetic sensor. In such an embodiment the magnetic sensor is configured to detect the horizontal plane (earth magnetic field) and the gravity vector. The information generated by the magnetic sensor is used to calibrate the other sensors to correct for drift.

The first motion identifier 28 is disposed in a predefined position and orientation in the toothbrush 20. Therefore, the orientation and position of the brush head 22, acting as the treating unit, can be easily determined based on the known orientation and position of the first motion identifier 28. That is the brush head 22 is in a fixed spatial relative arrangement to the first motion identifier 28.

The device communication module 29 is configured to communicate with the wearable electronic unit 40. Therefore, toothbrush 20 and the wearable electronic unit 40 are able to communicate with each other. The toothbrush 20 and the wearable electronic unit 40 communicate via a wireless connection. The device communication module 29 has a transmitter and a receiver. The device communication module 29 is configured to transmit signals and/or data. Therefore, information generated by the first motion identifier 28 is able to be transmitted to the wearable electronic unit 40. The device communication module 29 is also configured to receive signals and/or data. Therefore, the toothbrush is able to receive information. The device communication module 29 is connected to the device controller 27. The device communication module 29 is a wireless module, for example radio or infra-red transmitters and receivers. It will be understood that WiFi™ and Bluetooth™ technologies may be used.

The wearable electronic unit 40 acts as a reference member. The reference member is adapted to be mounted to the body of the user in a predefined position.

In the embodiment shown in FIGS. 1 and 3, the wearable electronic unit 40 is a head-mountable display unit, such as a pair of smart glasses or spectacles. On example of a head-mountable display unit is Google Glass™.

The wearable electronic unit 40 has a power supply 45, such as a battery. The battery is rechargeable. In the present embodiments, the power supply is an in-built rechargeable battery, however it will be understood that alternative power supply means are possible, for example a power cord that connects the wearable electronic unit 40 to an external electricity source.

The wearable electronic unit 40 also has a user input 46. The user input 46 allows a user to operate the wearable electronic unit 40, for example to adjust settings. The user input 46 may, for example, be one or more buttons, touch screens or switches.

The wearable electronic unit 40, acting as a reference member, comprises a unit controller 47, a second motion identifier 48 and a unit communication unit 49.

The unit controller 47 comprises a processor 50 and a memory 51. The unit controller 47 is operable to operate the wearable electronic unit 40.

The processor 50 of the unit controller 47 may take any suitable form. For instance, the processor 50 may be or include a microcontroller, plural microcontrollers, circuitry, a single processor, or plural processors. The unit controller 47 may be formed of one or multiple modules.

The memory 51 of the unit controller 47 takes any suitable form. The memory 51 may include a non-volatile memory and/or RAM. The non-volatile memory may include read only memory (ROM), a hard disk drive (HDD) or a solid state drive (SSD). The memory stores, amongst other things, an operating system. The memory may be disposed remotely. The RAM is used by the processor 50 for the temporary storage of data. The operating system may contain code which, when executed by the unit controller 47, controls operation of each of the hardware components of the system 10, or alternatively the wearable electronic unit 40 alone. The unit controller 47 may be able to cause one or more objects, such as one or more profiles, to be stored remotely or locally by the memory. The unit controller 47 may be able to refer to one or more objects, such as one or more profiles, stored by the non-volatile memory and upload the one or more stored objects to the RAM. The one or more profiles may be a reference profile. The reference profile may be stored as a look-up table, or other known means.

The wearable electronic unit 40, acting as the reference member, further includes a feedback module 41. The feedback module 41 is configured to provide feedback to a user. The feedback may be one or more of an audible indication, a visual indication or a tactile indication. In one embodiment, the feedback module includes a display. The display is operable in response to signals from the unit controller 47 to produce visual indicators or signals to the user. It will be understood that in some embodiments the display may be omitted. In the present arrangement the display is disposed on the frame of the pair of glasses, acting as the wearable electronic unit 40, and extends into the eye line of the user when the pair of smart glasses is worn by the user. Therefore, the user is able to easily identify visual feedback.

In one embodiment, the feedback module includes a speaker (not shown). The speaker is operable in response to signals from the unit controller 47 to produce audible indicators or signals to the user. It will be understood that in some embodiments the speaker may be omitted. In the present arrangement the speaker is disposed on the frame of the pair of smart glasses, acting as the wearable electronic unit 40. Therefore, the speaker will be disposed close to a user's head to enable audible signals generated by the speaker to be easily heard by a user.

In one embodiment, the feedback module includes a vibration motor (not shown), for example to provide tactile feedback to a user (not shown). The vibration motor is operable in response to signals from the unit controller 47 to produce tactile indicators or signals to the user. It will be understood that in some embodiments the vibration motor may be omitted. In the present arrangement the vibration motor is disposed on the frame of the pair of smart glasses, acting as the wearable electronic unit 40. Therefore, the speaker will be disposed close to a user's head to enable tactile signals generated by the vibration motor to be easily detected by a user.

The user input 46 in the present embodiment includes one or more hardware keys (not shown), such as a button or a switch. The user input 46 is disposed on an auxiliary device (not shown) in communication with the wearable electronic unit 40, although it will be understood that the user input 46 may be on the wearable electronic unit 40, or a combination thereof. The user input 46 is operable, for example, to enable a user to select an operational mode, to activate the system 10, and/or disable the system 10.

The second motion identifier 48 is on the wearable electronic unit 40. The second motion identifier 48 is a 6-axis spatial sensor. Spatial sensors are known and so a detailed description will be omitted. The second motion identifier 48 is configured to provide the readings of six axes of relative motion (three axes translation and three axes rotation). The second motion identifier 48 is configured to generate information indicative of the acceleration and/or angular orientation of the wearable electronic unit 40. The information generated by the second motion identifier 48 is provided to the unit controller 47.

Although in the present and other described embodiments the second motion identifier 48 is a 6-axis spatial sensor, it will be understood that alternative sensors may be used. The second motion identifier 48 may include one or more different sensors, for example, inertial sensors, accelerometers, gyroscopes, or combinations thereof. The second motion identifier 48 may also include a calibration module, such as a magnetic sensor. In such an embodiment the magnetic sensor is configured to detect the horizontal plane (earth magnetic field) and the gravity vector. The information generated by the magnetic sensor is used to calibrate the other sensors to correct for drift.

The second motion identifier 48 is disposed in a predefined position and orientation in the wearable electronic unit 40. It will be understood that the wearable electronic unit 40 is adapted to be mounted on the user's body in a predefined position relative to the part of the body to be treated. In this embodiment, the pair of smart glasses is mountable to the user's head in a predefined position and orientation based on the position of the user's nose and ears. Therefore, the wearable electronic unit 40, and therefore the second motion identifier 48, is mountable in a repeatable position and orientation. Therefore, the orientation and position of the part of the body to be treated can be easily determined based on the known orientation and position of the second motion identifier 48. That is, the part of the body to be treated is in a fixed relative spatial arrangement to the second motion identifier 48 when the wearable electronic unit 40 is mounted to the user's body.

It will be understood that the position and orientation of the part of the person's body to be treated relative to the second motion identifier 48 may vary dependent on the user. Therefore, the system 10 may be configured to perform a calibration mode to determine a reference profile of the part of the body to be treated in dependence on the relative position and orientation of the second motion identifier 48.

The unit communication module 49 is configured to communicate with the toothbrush 20. Therefore, toothbrush 20 and the wearable electronic unit 40 are able to communicate with each other. The toothbrush 20 and the wearable electronic unit 40 communicate via a wireless connection. The unit communication module 49 has a transmitter and a receiver. The unit communication module 49 is configured to transmit signals and/or data. Therefore, information generated by the first motion identifier 28 is able to be received by the wearable electronic unit 40. The unit communication module 49 is also configured to transmit signals and/or data. Therefore, the unit communication module 49 is able to transmit information. The unit communication module 49 is connected to the unit controller 47. The unit communication module 49 is a wireless module, for example radio or infra-red transmitters and receivers. It will be understood that WiFi™ and Bluetooth™ technologies may be used.

Although, in the present embodiment, the wearable electronic unit 40 is a head-mountable display unit, it will be understood that the wearable electronic unit is not limited thereto. In another embodiment the wearable electronic unit 40, acting as a reference member, comprises a clip which is attached to the body of the user or to an article of clothing. Alternatively, the wearable electronic unit 40 is a module which is adapted to be attached to a band, article of clothing or directly to the body of a user. Such a module may be attachable via a clip, removable adhesive or other known attachment means. In an alternative arrangement, the wearable electronic unit 40 is, for example, a band, such as a wrist band or ankle band, an article of clothing, a smart watch, a necklace, or other such unit. It will be understood that the wearable electronic unit 40 is mountable, directly or indirectly, to the body of the user.

Figure 2:
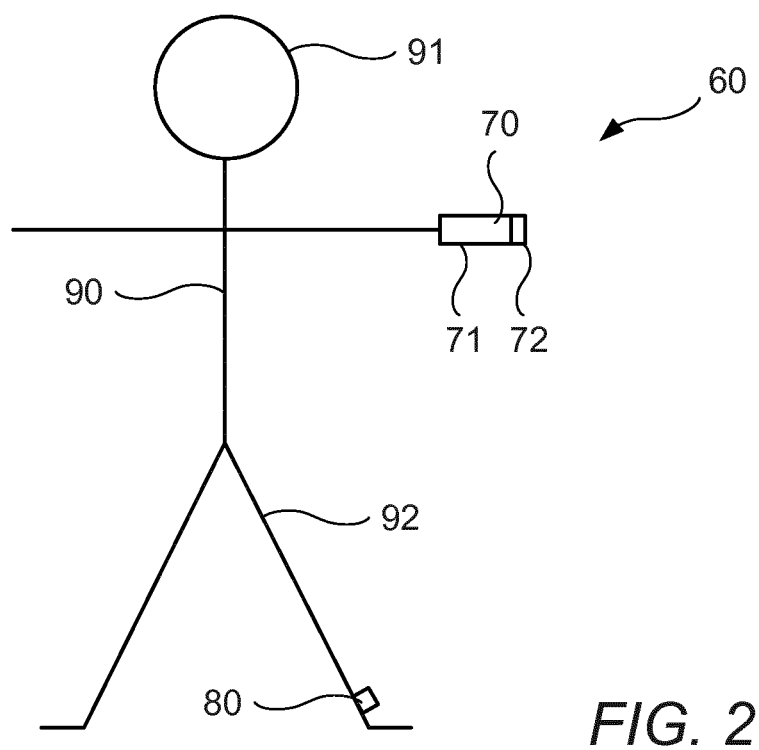
FIG. 2 shows a schematic view of one system for cutting hair.

One alternative embodiment of a system 60 for treating part of a body to be treated is shown in FIG. 2. The arrangement of this embodiment of the system 60 is generally the same as the system 10 shown in FIGS. 1 and 3 and so a detailed description will be omitted. However, in this embodiment the system 60 for treating part of a body to be treated is a system for cutting hair. The system 60 comprises a cutting device 70 and a wearable electronic unit 80, acting as a reference member. The cutting device 70, acting as a treating device, comprises a handle 71 and a cutting head 72.

The cutting device 70 is a hand-held electrical hair shaving device. However, it will be apparent that the cutting device 70 may have an alternative arrangement. For example, the cutting device 70 may be a hand-held hair trimming device. The cutting device 70 acts as a treating device. The cutting device 70 is moved over a skin of a part of a user's body 90, for example their leg 91, to shave hair on that part of the body.

The cutting head 72 is configured to cut hair. The cutting head 72 acts as a treating unit. The cutting head 72 comprises a foil (not shown) through which hairs protrude, and a moving blade (not shown) which moves over the foil. In an alternative arrangement, a moveable blade (not shown) with a first array of teeth is moveable in a reciprocal manner against a stationary blade (not shown) with a second array of teeth.

In the embodiment shown in FIG. 2, the wearable electronic unit 80 is an ankle band. The ankle band has a collar section (not shown) which extends around the user's ankle and a sensor module (not shown) on the collar section. The ankle band is resilient to allow the wearable electronic unit 80 to be securely mounted to the user's ankle. It will be understood that attachment of the wearable electronic unit 80 to the ankle provides for repeatable attachment. This allows the wearable electronic unit 80 to be mounted in a defined repeatable relative arrangement to the part of the body to be treated.

Alternative the ankle band is rigid, and one section is rotatable relative to another to allow the wearable electronic unit 80 to be attached to the user. Further alternative mounting arrangements are anticipated.

To operate the system 10 of FIGS. 1 and 3, the user places the head-mountable display unit on their head in a standard glasses wearing position. That is, the wearable electronic unit 40 is mounted on the user's head in a specific position and orientation. As the user's facial features are in fixed positions relative to each other, the wearable electronic unit 40, and therefore the second motion identifier 48, is disposed in a known position relative to the user's teeth. The distance and orientation of the user's teeth from the user's nose and ears are fixed, and so the wearable electronic unit 40 is therefore mounted in a predefined spatial arrangement with the part of the body to be treated. Based on the position of and orientation of the wearable electronic unit 40 on the user's head, the position and orientation of the user's teeth is therefore known.

It will be understood that the relative positions of a user's teeth, which in this embodiment is the part of the user's body to be treated, and other facial features differ from person to person within known parameters. Therefore, it is possible for a reference profile to be stored by the memory 51 based on these known parameters. The unit controller 47 is therefore able to refer to the reference profile stored by the unit memory 51 to determine information indicative of acceleration and orientation of the user's teeth based on information indicative of the acceleration and orientation of the second motion identifier 48 generated by the second motion identifier 48.

In the present embodiment, the reference profile is pre-loaded in the memory, and may be based on average facial dimensions. Alternatively, a new reference profile is stored, or the existing reference profile modified, in the unit memory 51 by the unit controller 47 during a calibration mode.

The system 10 is actuated by the user. The device controller 27 controls the motor 24 to operate the toothbrush 20 in a treatment mode. It will be understood that the toothbrush 20 may have more than one treatment mode. The first motion identifier 28 is operated to generate information indicative of the acceleration and/or angular orientation of the treating device. This information is provided to the unit controller 47 by the device communication module 29 transmitting this information, which is then received by the unit communication module 49. As the distance and orientation of the brush head 22, acting as the treating unit, from the first motion identifier 28 is known and stored, the unit controller 47, or device controller 27, is able to determine indicative acceleration and angular orientation of the brush head 22.

The second motion identifier 48 is operated to generate information indicative of the acceleration and/or angular orientation of the wearable electronic unit 40, acting as the reference member. This information is provided to the unit controller. As the distance and orientation of the teeth, which is the part of the body to be treated, from the second motion identifier 48 is determined by reference to the stored reference profile, the unit controller 47 is able to determine indicative acceleration and angular orientation of the teeth.

Based on the information provided by the first and second motion identifiers 28, 48, the unit controller 47 is able to produce information indicative of the trajectory and orientation of the brush head 22 relative to the user's teeth. The unit controller 47 determines the trajectory and orientation of the brush head 22 based on the information provided by the first motion identifier 28. The unit controller 47 determines the trajectory and orientation of the user's teeth based on the information provided by the second motion identifier 48 and reference to the stored reference profile.

The user uses the system 10 in the operating mode by holding the hand-held toothbrush 20 and moving the toothbrush 20 over the user's teeth. The brush head 22 is placed against the user's teeth and the brush 23 is moved by the motor 24. With a conventional toothbrush, an accurate determination of the extent of the treating action is difficult to predict and control and the user relies on their skill to move the device in the appropriate manner. Furthermore, the correct orientation of the brush head relative to each other is difficult to determine, in particular for back teeth which are difficult for a user to see.

The invention as defined in the claims provides a system for treating a part of a body to be treated, including treating teeth. The system 10 is operable to provide information indicative of the trajectory and/or angle of orientation of the treating unit relative to the part of the body to be treated. The system may also operate a feedback module to provide feedback to a user based on the trajectory and/or angle of orientation of the treating device determined by the controller.

The unit controller 47 is configured to determine the acceleration based on information generated by the first motion identifier 28. In particular, the unit controller 47 may be configured to determine the acceleration of the toothbrush by monitoring the information generated by the first motion identifier 28 and determining the change in position of the first motion identifier 28 based on the determined change in position of the first motion identifier 28 over a predetermined time period. The unit controller 47 may also, or alternatively, determine the angle of orientation of the toothbrush 20 relative to the part of the body to be treated.

The first motion identifier 28 is able to generate information indicative of the toothbrush 20 on a continuous or predefined interval basis. The first motion identifier 28 is therefore capable of providing information indicative of the path of the toothbrush 20. The second motion identifier 48 is able to generate information indicative of the part of the body to be treated on a continuous or predefined interval basis. The second motion identifier 48 is therefore capable of providing information indicative of the path of the part of the body to be treated. The unit controller 47 therefore produces information indicative of the trajectory and orientation of the treating unit relative to the part of the body to be treated based on the information provided by the first and second motion identifiers 28, 48. The unit controller 47 is configured to determine relative trajectory and orientation based on a comparison of the information provided by the first and second motion identifiers 28, 48.

With information indicative of the trajectory and orientation of the part of the body to be treated, in this case the user's head, and the toothbrush 20 known, it is possible to determine the position, path and/or angle of orientation of the toothbrush 20 relative to the part of the body to be treated based on information provided by the first and second motion identifiers 28, 48. The relative positions may be calculated based on vector subtraction. Therefore, the relative positions may be easily determined.

When the user places the toothbrush 20 against the user's teeth and moves the toothbrush 20 over the teeth, the system 10 is able to determine the relative positions of the toothbrush 20. The system 10 is also able to determine the path of the toothbrush 20 relative to the teeth based on the generated data provided to the unit controller 47. The system 10 is also, or alternatively, able to determine the angle of orientation of the toothbrush 20 relative to the part of the body to be treated based on the generated provided to the unit controller 47. The unit controller 47 receives data from the first motion identifier 28 and the second motion identifier 48, and the unit controller 47 is configured to operate the feedback module 41, such as the speaker or the display, in response to the data received to provide feedback to the user.

The unit controller 47 is configured to refer to the reference profile of the part of the body to be treated. The reference profile may be stored in a look-up table. The reference profile may be stored by the memory 51. In such an arrangement, the unit controller 47 is configured to refer to the memory 51 to access the reference profile. In one embodiment, the reference profile is stored by the RAM.

The reference profile provides information of the part of the body to be treated. Therefore, the unit controller 47 is able to determine the relative arrangement of the user's teeth relative to the wearable electronic unit 40. The information stored by the reference profile is communicated and stored with reference to a coordinate system. One such configuration uses a polar coordinate system in which each position on the part of the body to be treated is determined by a distance from a fixed point and an angle from a fixed direction. Another configuration uses a Cartesian coordinate system. For each point a condition, such as a value, of the operating characteristic is given. Alternatively, the reference profile may define a map of the part of the user's body to be treated.

Although in one arrangement every possible position of the part of the body to be treated is stored, in an alternative embodiment a limited number of positions are stored, for example extremities of the part of the body to be treated, and the unit controller 47 is configured to extrapolate and interpolate data for other positions based on the one or more given limited number of positions. An advantage of such an approach is that the size of data for the reference profile can be minimised.

As the toothbrush 20 is moved over the part of the body to be treated, the unit controller 47 is configured to determine information indicative of the acceleration and angular orientation of the reference member by reference to the reference profile. It will be understood that the brush head 22 will have an operating zone over which treatment will be provided. That is the treatment head 22 will have a treating zone which, when positioned over a section of the part of the body to be treated, will affect treatment on said section.

The unit controller 47 is configured to track the path of the toothbrush 20 relative to the part of the body to be treated. The unit controller 47 is configured to record the track of the path of the toothbrush 20. That is, the unit controller 47 is configured to determine the path of the toothbrush 20 relative to the part of the body to be treated and cause information indicative of the path of the toothbrush 20 to be stored by the unit memory 51.

The unit controller 47 is configured to compare the information indicative of the tracked path of the toothbrush 20 relative to the user's teeth, based on the tracked path of the wearable electronic unit 40, with the reference profile providing information indicative of the part of the body to be treated. Therefore, the unit controller 47 is able to determine an area of the part of the body to be treated that has been treated. That is, the unit controller 47 is able to determine the area of the part of the body to be treated that has been treated based on the determined trajectory and orientation of the toothbrush 20 relative to the teeth based on the information provided by the first and second motion identifiers 28, 48. The unit controller is also configured to take into account the width and/or footprint of the brush head 22. The arrangement of the brush head 22 may be stored by the memory and be referred to by the unit controller 47. With such an arrangement the unit controller 47 is able to determine the area that the brush head 22 has passed over. In the present embodiment, the unit controller 47 is configured to record that an area of the part of the body to be treated has been treated when it is determined that the brush head 22 has passed over it along any path relative to the part of the body as determined by the relative acceleration and angular orientation of the first and second motion identifiers 28, 48. In an alternative embodiment, the unit controller 47 is configured to record that an area of the part of the body to be treated has been treated when the unit controller 47 determines that the brush head 22 has passed over it along one or more predefined orientations.

In an embodiment in which the unit controller 47 is configured to record that an area of the part of the body to be treated has been treated when the unit controller 47 determines that the brush head 22 has passed over it along one or more predefined orientations and/or trajectory relative to the part of the body to be treated, the predefined orientation and/or trajectory is determined by the unit controller 47 referring to the reference profile.

When the unit controller 47 determines that the predefined part of the body to be treated with reference to the reference profile has been treated, either by the brush head 22 passing over the entire area in any orientation, or in predefined orientation, the unit controller 47 is configured to operate the, or one or more of the, feedback modules, for example the speaker, display, and/or vibration motor, to provide feedback to the user that a predefined area of the part of the body to be treated, or the part of the body to be treated, has been treated. Therefore, it is possible for the system 10 to indicate to a user that the whole of the part of the body to be treated has been treated, and so no areas have been missed.

In the present embodiment, the unit controller 47 is configured to operate the display to emit a sound when the controller determines that the part of the body to be treated as defined by the reference profile referred to by the controller has been treated. Alternatively, the unit controller 47 may be configured to operate one or more other feedback modules, such as the speaker, another visual indicator, or the vibration motor to provide tactile feedback.

In one embodiment, the unit controller 47 is configured to operate the display, for example, to provide active feedback to a user during operation of the system 10. In one such embodiment, the unit controller 47 is configured to operate the display to show a map of the part of the body to be treated based on the reference profile referred to by the unit controller 47. The unit controller 47 may then be configured to operate the display to show the path of the brush head 22 over the part of the body to be treated based on the information generated by the unit controller 47, and to show the part of the body that has been treated. The system 10 is then able to easily provide feedback to the user of the part of the body to be treated that has been treated and that has yet to be treated. The display may show an actual or schematic map of the part of the body to be treated, and may also show the relative position of the brush head 22.

In one embodiment, the system 10 is configured to provide feedback during use to indicate a trajectory and/or orientation that the user should follow based on the provided information and reference profile referred to by the unit controller 47. With such a system 10, the unit controller 47 may be configured to operate one or more feedback modules to provide one or more of visual, audible or tactile feedback.

It will be understood that one or more different feedback means may be used to provide an indication to the user of the desired path of the brush head 22 relative to the part of the body to be treated.

Once a full transversal of the part of the body to be treated has been completed and the unit controller 47 has operated one or more of the feedback modules to indicate that the treatment of the part of the body to be treated has been completed, the user is able to move the toothbrush 20 away from the part of the body to be treated. It will be understood that the toothbrush 20 may be moved away from the part of the body to be treated during treatment, and the system 10 will be able to continue to operate when the toothbrush 20 is moved back towards the part of the body to be treated. With this arrangement it is possible for the user to move the part of the body to be treated and for the movement to be determined and taken into account by the unit controller 47 based on the generated data.

Although in the above described embodiment one reference profile is used, it will be understood that the unit controller 47 may be configured to select from two or more reference profiles in response to a user input.

In an alternative embodiment, the reference profile also stores other operating characteristics, such as a desired pressure or dwell period, and the unit controller 47 informs the user of the toothbrush via the one or more feedback modules, for example the speaker and/or display. Alternatively, the unit controller 47 is configured to change an operating characteristic of the toothbrush 20, for example the operating speed of the motor 24. For example, while the toothbrush is in use the unit controller 47 will alter an operating characteristic of the feedback module 41 to inform the user in dependence on the information generated by the first and second motion identifiers 28, 48 so that the user can take the appropriate action. The feedback module may provide an acoustic signal, in the form of an audible sound such as a beeping sound. Alternatively, the feedback module may provide tactile feedback in the form of vibrations that are felt by the user via the handle of the device. Alternatively, the feedback module may provide an optical signal, such as flashing light or other optical indicator. It will be appreciated that the feedback module may also provide more than one of the above mentioned signals in dependence on the information produced by the controller.

In another alternative or complimentary embodiment, the reference profile also stores data relating to one or more operating characteristics of the toothbrush, such as the operating speed of the motor 24, which is correlated to the stored acceleration and/or angular orientation data. The unit controller 47 is configured to refer to the stored operating characteristic and to alter the operating characteristic of the toothbrush 20 in response to the information indicative of the trajectory and/or orientation of the brush head relative to the part of the body to be treated produced by the controller. With such an arrangement it is possible to vary the intensity of the treatment dependent on the orientation and/or position of the brush head relative to the teeth. The toothbrush 20, acting as a treating device, may also include an auxiliary operating unit (not shown), such as a fluid applicator. The or one of the stored operating characteristics of the toothbrush 20 to which the unit controller 47 is configured to refer, and to which the unit controller 47 is configured to alter, may therefore be the operating characteristic of the auxiliary operating unit.

The system 10 may be initially operated in a calibration mode. The calibration mode may be activated by user input. In the calibration mode, the unit controller 47 is configured to create a reference profile, or to modify an existing reference profile.

In the calibration mode, the user moves the brush head 22, acting as the treating unit, over the teeth. The user may complete a full brushing action or may simply move the brush head 22 over all of the teeth. This action may be indicated to the user by the feedback module. As the user undertakes this action, the unit controller 47 is provided with information indicative of the acceleration and/or angular orientation of the brush head by the first motion identifier 28, and information indicative of the acceleration and/or angular orientation of the user's teeth by the second motion identifier 48 in the wearable electronic unit 40 mounted on a user's head. Therefore, the unit controller 47 is configured to correlate the information provided by the first and second motion identifiers 28, 48 to generate information indicative of the trajectory and orientation of the brush head 22 and the user's teeth that should be completed to ensure that a full treating action has been performed. This correlated information is stored by the unit controller 47 as a reference profile. It will be understood that the unit controller 47 may, instead of forming a new reference profile, modify the recorded information in an existing stored reference profile.

The first motion identifier 28 is operable to generate information indicative of the brush head 22 based on the determined position of the first motion identifier 48.

The second motion identifier 48 is operable to generate information indicative of the part of the body to be treated based on the determined position of the second motion identifier 48. The unit controller 47 is configured to correlate the information provided by the first and second motion identifiers 28, 48 and to form a reference profile based on this information.

Once the user has completed a treating action, the unit controller 47 is configured to store the correlated data relating to the information received from the first and second motion identifiers 28, 48 during the calibration mode to form the reference profile of the part of the body to be treated.

In an alternative embodiment, the unit controller 47 operates the display, acting as the feedback module, to indicate to the user one or more predefined positions to locate the brush head 22 on the part of the body to be treated. When the brush head 22 is disposed in the or each of the defined positions the unit controller 47 is provided an indication to store the data, for example by a user input. The unit controller 47 is configured to store this data, for example in the RAM. The unit controller 47 may then extrapolate this data to form a new reference profile of the part of the body to be treated. This reference profile may be referred to by the unit controller 47 to provide information indicative to the relative trajectory and/or orientation of the brush head 22 relative to the teeth.

The reference profile is recorded and stored by the unit controller 47 in the memory 51 for reference during use of the system 10, or during future use of the system 10.

In another alternative or complimentary embodiment, the toothbrush 20, acting as a treating device, further comprises a sensor 32 configured to detect one or more properties of the part of the body to be treated. For example, the brush head 24 may include a plaque-detecting sensor configured to determine the presence of plaque. The sensor 32 may be an optical sensor. The unit controller 47 is configured to produce information indicative of the one or more properties of the part of the body to be treated based on the information provided by the sensor 32.

In one embodiment, the unit controller 47 is operable to indicate to a user when a property of the part of the body to be treated, for example the presence of plaque on a tooth, is determined. The unit controller 47 is configured to operate the, or one or more of the, feedback modules, for example the speaker, display, and/or vibration motor, to provide feedback to the user based on the determined property of the part of the body to be treated. The information indicative of the one or more properties of the part of the body to be treated based on the information provided by the sensor 32 may be correlated with the information provided by the first and second motion identifiers 28, 48 by the unit controller 47 to provide information indicative of the one or more properties of the part of the body for each section of the part of the body being treated.

In another embodiment, the unit controller 47 is operable to adjust an operating characteristic of the toothbrush 20 based on the determined property of the part of the body to be treated.

The unit controller 47 may also or alternatively be configured to form a reference profile or to modify an existing reference profile based on the produced information indicative of the one or more properties of the part of the body to be treated correlated with the with the information provided by the first and second motion identifiers 28, 48. The forming and storing of a new reference profile or modification of an existing profile may be done during a calibration mode, or during a first pass of a treating mode over the part of the body to be treated.

The unit controller 47 is configured to refer to the data stored by the reference profile relating to the one or more properties of the part of the body to be treated, such as the presence of plaque, which is correlated to the stored acceleration and/or angular orientation data. The unit controller 47 is configured to refer to the stored reference profile and to alter the operating characteristic of the toothbrush 20 in response to the information indicative of the trajectory and/or orientation of the brush head relative to the part of the body to be treated produced by the controller. With such an arrangement it is possible to vary the intensity of the treatment dependent on the determined presence of plaque together with the orientation and/or position of the brush head relative to the teeth.

As the treatment continues, it is possible for the unit controller 47 to modify the reference profile based on further correlated information received from the sensor 32 and the first and second motion identifiers 28, 48. Therefore, it is possible for the effects of the treatment to be analyzed.

With the above embodiments, it will be understood that it is possible to take into account any movement of the part of the body to be treated during treatment of the part of the body. This means that the user is able to move the part of the body to be treated during treatment, and so the measurements of movements of the treating head may be corrected for the motion of the part of the body to be treated. Therefore, it is possible to maintain an effective tracking of the treatment that has been performed.

It will be understood that with the above described embodiments relating to brushing teeth then the lower jaw of a user is movable relative to the upper jaw. However, it will be understood that the angle of rotation is static or extremely limited during a tooth brushing action, and so the effect on determining information indicative of the trajectory and/or orientation of the treating unit relative to the part of the body to be treated will be negligible.

Furthermore, it will be understood that the position of the rotation axis of the jaw is known, or may be determined during the calibration stage. Therefore, the controller may be configured to take any rotation of the jaw into account, and for the reference profile to include information representative of rotation of the jaw. Therefore, in the event that the wearable electronic unit is mounted to the upper jaw, for example, it is possible to determine when, and which section of the lower jaw is being treated.

Although in the above described embodiments the feedback module is on the reference member, it will be understood that in an alternative embodiment the feedback module is on the treating device. Alternatively, the feedback module may be a separate feedback module, for example a feedback module in a mobile computing device or a base unit.

Although in the above described embodiments the controller configured to produce information indicative of the trajectory and/or orientation of the treating unit relative to the part of the body to be treated based on the information provided by the first and second motion identifiers is the unit controller, it will be understood that in an alternative arrangement the controller configured to produce information indicative of the trajectory and/or orientation of the treating unit relative to the part of the body to be treated based on the information provided by the first and second motion identifiers is the device controller. Furthermore, in an alternative arrangement the controller comprises both the device controller and the unit controller. Alternatively, the controller configured to produce information indicative of the trajectory and/or orientation of the treating unit relative to the part of the body to be treated based on the information provided by the first and second motion identifiers may be a separate controller, for example a controller in a mobile computing device or a base unit. In such an arrangement, this controller will be configured to be provided with information generated by both the first and second motion identifiers. The information indicative of the trajectory and/or orientation of the treating unit relative to the part of the body to be treated based on the information produced by this separate controller may then be provided to one or both of the treating device or the reference member.

It will be appreciated that the term "comprising" does not exclude other units or steps and that the indefinite article "a" or "an" does not exclude a plurality. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A system for treating a part of a body of a person to be treated, the system comprising:
 a treating device including
  a treating unit,
  a first motion identifier configured to generate information indicative of an acceleration and/or an angular orientation of the treating device, wherein the first motion identifier is one of a 6-axis spatial sensor, a set of inertial sensors, accelerometers, gyroscopes, or combinations thereof, and
  a sensor configured to detect one or more properties of the part of the body to be treated;
 a reference member adapted to be mountable to a person in fixed relationship to a part of the body to be treated, the reference member including a second motion identifier configured to generate information indicative of an acceleration and/or an angular orientation of the reference member, wherein the second motion identifier is one of a 6-axis spatial sensor, a set of inertial sensors, accelerometers, gyroscopes, or combinations thereof; and
 a controller configured to produce information indicative of the trajectory of the treating unit relative to the part of the body to be treated based on the information provided by the first and second motion identifiers,
  wherein the controller is further configured to produce information indicative of the one or more properties of the part of the body to be treated based on the information provided by the sensor, and
  wherein the controller is further configured to adjust one or more operating characteristics of the treating unit in dependence on one or more of the properties of the part of the body to be treated that are detected by the sensor and in response to the information indicative of the trajectory of the treating unit relative to the part of the body to be treated that are produced by the controller.

2. The system according to claim 1, further comprising:
a feedback module, wherein the controller is configured to operate the feedback module to provide feedback to the person to be treated in response to the information indicative of the trajectory of the treating unit relative to the part of the body to be treated produced by the controller.

3. The system according to claim 2,
wherein the feedback module includes a display; and
wherein the controller is configured to operate the display to show a map of the part of the body to be treated on the display, and to provide an indication on the map of the trajectory of the treating unit relative to the part of the body to be treated.

4. The system according to claim 1, wherein the treating device is a toothbrush, and/or wherein the reference member is a wearable electronic unit.

5. The system according to claim 1, wherein the controller includes a memory storing a reference profile indicative of the part of the body to be treated, the controller being configured to refer to the reference profile stored by the memory, and to compare the produced information indicative of the trajectory of the treating unit relative to the part of the body to be treated with the reference profile.

6. The system according to claim 5, wherein the controller is configured to track the trajectory and/or angular orientation of the treating unit and to compare the tracked trajectory and/or angle of orientation of the treating unit with the reference profile indicative of the part of the body to be treated to determine an area of the part of the body to be treated that has been treated by the treating device based on the tracked trajectory and/or angle of orientation of the treating unit.

7. The system according to claim 1, wherein the controller is further configured to produce additional information indicative of an orientation of the treating unit relative to the part of the body to be treated based on the information provided by the first and second motion identifiers.

8. The system according to claim 1, wherein the treating device is one of a toothbrush, an epilator, a shaver, a trimmer, an exfoliator, a microdermabrasion device, a laser hair cutting device, a moisturiser and an intense pulsed light based device.

\* \* \* \* \*